(12) United States Patent
Willson et al.

(10) Patent No.: US 11,403,136 B1
(45) Date of Patent: *Aug. 2, 2022

(54) TASK EXECUTION APPLICATION PROGRAMMING INTERFACE

(71) Applicant: Intuit Inc., Mountain View, CA (US)

(72) Inventors: Michael Willson, Sunnyvale, CA (US); Gennadiy Ziskind, San Mateo, CA (US)

(73) Assignee: Intuit Inc., Mountain View, CA (US)

( * ) Notice: Subject to any disclaimer, the term of this patent is extended or adjusted under 35 U.S.C. 154(b) by 544 days.

This patent is subject to a terminal disclaimer.

(21) Appl. No.: 16/524,599

(22) Filed: Jul. 29, 2019

(51) Int. Cl.
| | |
|---|---|
| *G06F 9/48* | (2006.01) |
| *G06F 9/50* | (2006.01) |
| *G06F 9/455* | (2018.01) |
| *G06F 9/34* | (2018.01) |
| *G06F 9/38* | (2018.01) |
| *G06F 9/54* | (2006.01) |

(52) U.S. Cl.
CPC .............. *G06F 9/4881* (2013.01); *G06F 9/34* (2013.01); *G06F 9/3826* (2013.01); *G06F 9/3857* (2013.01); *G06F 9/455* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 9/5027* (2013.01); *G06F 9/5038* (2013.01); *G06F 9/5061* (2013.01); *G06F 9/541* (2013.01); *G06F 9/542* (2013.01)

(58) Field of Classification Search
CPC ...... G06F 9/489; G06F 9/4806; G06F 9/4843; G06F 9/4881; G06F 9/50; G06F 9/5005; G06F 9/5027; G06F 9/5038; G06F 9/5061; G06F 9/455; G06F 9/541; G06F 9/542

See application file for complete search history.

(56) References Cited

U.S. PATENT DOCUMENTS

| | | | |
|---|---|---|---|
| 11,216,303 B1 * | 1/2022 | Willson | G06F 9/4881 |
| 2021/0042148 A1 * | 2/2021 | Alford | G06F 21/604 |

* cited by examiner

*Primary Examiner* — Charles M Swift
(74) *Attorney, Agent, or Firm* — Ferguson Braswell Fraser Kubasta PC (57) ABSTRACT

A task execution application programming interface may include a pipeline execution service interface configured to communicate between a task image and a pipeline execution service adapter. The pipeline execution service adapter may be configured to receive, from a pipeline execution service, a request to execute the task image in a pipeline. The request may include arguments. The task image may include executable code and an execution environment. The pipeline execution service interface may be further configured to obtain results by executing the executable code using the arguments in the execution environment. The pipeline execution service adapter may be further configured to provide, to the pipeline execution service, access to the results. The pipeline execution service may control execution of the pipeline using the results. The task execution application programming interface further includes the pipeline execution service adapter for communicating between the pipeline execution service interface and the pipeline execution service.

20 Claims, 9 Drawing Sheets

TASK EXECUTION APPLICATION PROGRAMMING INTERFACE

BACKGROUND

Conventional task execution (e.g., pipeline) systems typically include multiple components that require manual setup and integration. Conventional task execution systems also lack a consistent interface for task management and control, including: task registration, customization, validation, prioritization, execution, and results processing. In contrast, it would be desirable to provide a capability to uniformly and seamlessly execute a task in a task execution system so that the task execution system may adjust the execution flow of a pipeline based on the execution of the task.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a task execution application programming interface including a pipeline execution service interface configured to communicate between a task image and a pipeline execution service adapter. The pipeline execution service adapter is configured to receive, from a pipeline execution service, a request to execute the task image in a pipeline. The request includes arguments. The task image includes executable code and an execution environment. The pipeline execution service interface is further configured to obtain results by executing the executable code using the arguments in the execution environment. The pipeline execution service adapter is further configured to provide, to the pipeline execution service, access to the results. The pipeline execution service controls execution of the pipeline using the results. The task execution application programming interface further includes the pipeline execution service adapter for communicating between the pipeline execution service interface and the pipeline execution service.

In general, in one aspect, one or more embodiments relate to a task execution application programming interface including a pipeline execution service interface configured to communicate with a task image including executable code and an execution environment, and an environment variable corresponding to a directory. The task execution application programming interface is configured to provide, to a pipeline execution service, access to the directory, and receive, from the pipeline execution service, a request to execute the task image in a pipeline. The request includes arguments. The task execution application programming interface is further configured to obtain results by executing the executable code using the arguments in the execution environment. The pipeline execution service stores the arguments in the directory. The task image stores the results in the directory.

In general, in one aspect, one or more embodiments relate to a method performed by a task execution application programming interface including receiving, from a pipeline execution service, a request to execute a task image in a pipeline. The request includes arguments. The task image includes executable code and an execution environment. The method further includes obtaining results by executing the executable code using the arguments in the execution environment. The pipeline execution service controls execution of the pipeline using the results.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to an application programming interface (API) for task execution. A task image encapsulates executable code and an execution environment that includes software components needed for execution. The encapsulation enables the task image to be executed in multiple continuous integration/continuous deployment (CI/CD) pipelines without requiring modification of the task image or installation of additional software components. The task execution API enables task developers to uniformly deploy tasks in multiple pipelines that are managed by multiple pipeline execution services, such that each pipeline execution service may control the execution of its pipelines using execution metadata of the tasks, without requiring customization or manual intervention. For example, the execution metadata of the task may include an execution mode of the task that indicates whether a pipeline halts or continues execution when the execution of the task is unsuccessful. The task execution API is a common interface that may adapt to the requirements of multiple pipeline execution services.

In one or more embodiments, each pipeline execution service specifies execution requirements to be satisfied by the task image. The task execution API may adapt task execution requests to the specific execution requirements of each pipeline execution service. For example, the task execution API may set a flag in the execution request indicating that execution results are to be provided in a verbose format that includes detailed metrics (e.g., memory utilization metrics). Compliance with the execution requirements of a pipeline execution service enables a consistent interface for the management and control of task execution across pipelines managed by that pipeline execution service.

The task execution API may communicate with each pipeline execution service using a directory dedicated to the pipeline execution service, where the directory is located using an environment variable of the task image. The task execution API may convert execution results to a format that satisfies execution requirements specified by the pipeline execution service. For example, the task execution API may convert attribute names or values (e.g., error or status codes) included in the results to names or values recognized by the pipeline execution service.

The task execution API may provide feedback to task developers when execution requirements of the pipeline execution service are violated and/or when execution metadata pertaining to the task (e.g., an execution mode of the task) is modified by the pipeline execution service.

Figure 1A:
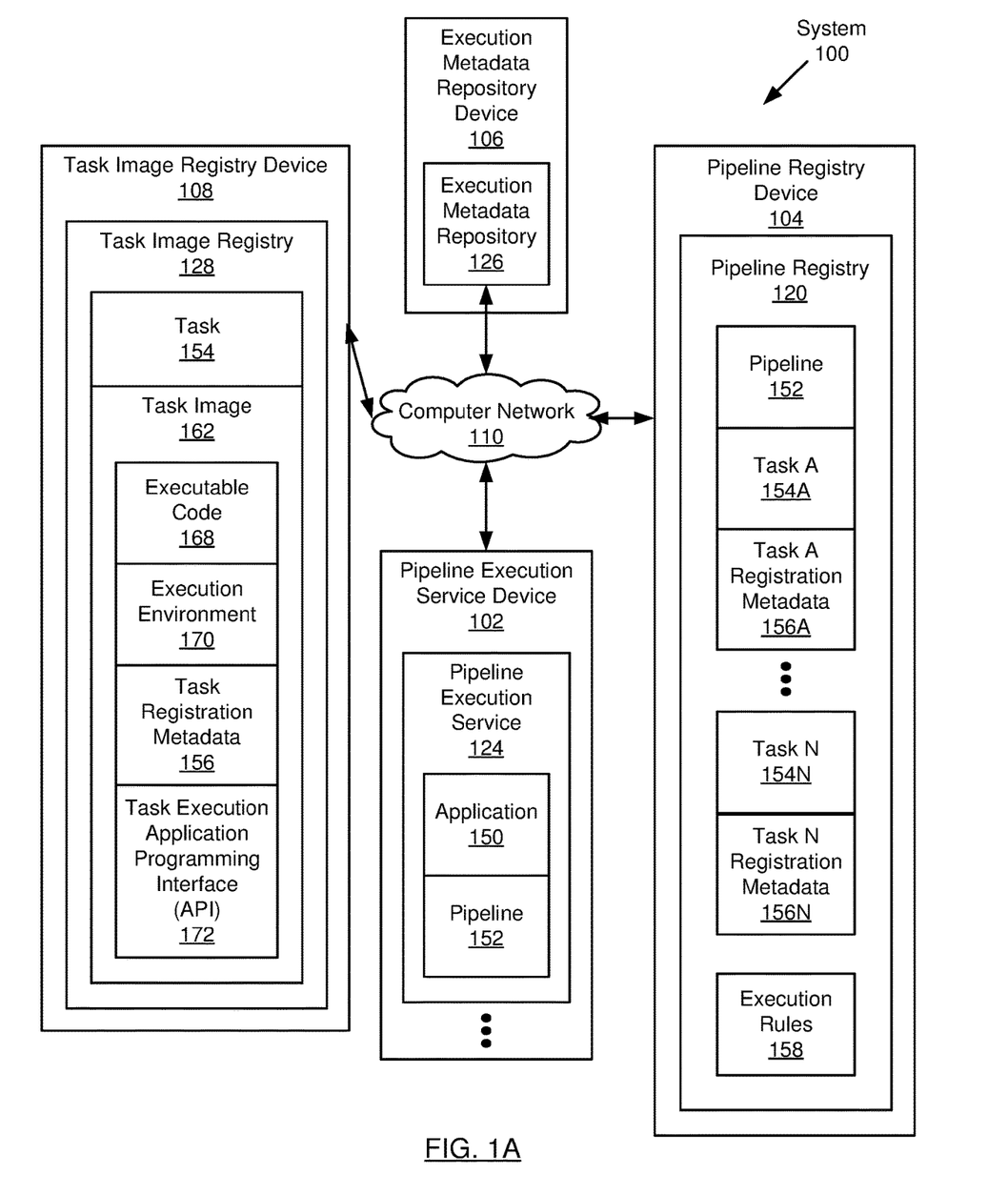
FIG. 1A, FIG. 1B, and FIG. 1C show a flow diagram of system in accordance with one or more embodiments of the invention.

FIG. 1A shows a system (100) in accordance with one or more embodiments of the invention. As shown in FIG. 1A, the system (100) includes a pipeline execution service device (102), a pipeline registry device (104), an execution metadata repository device (106), a task image registry device (108), and a computer network (110). The various devices and systems shown in FIG. 1A may correspond to the computing system (500) described with respect to FIG. 5A and the accompanying description below, or take the form of the client device (526) described with respect to FIG. 5B. In one or more embodiments, pipeline execution service device (102), the pipeline registry device (104), execution metadata repository device (106), and task image registry device (108) may communicate via the computer network (110) (e.g., the network (520) described with respect to FIG. 5B).

In one or more embodiments of the invention, the pipeline execution service device (102), pipeline registry device (104), execution metadata repository device (106), and/or task image registry device (108) include any type of storage unit and/or device (e.g., a file system, database, collection of tables, or any other storage mechanism) for storing data. Further, the pipeline execution service device (102), pipeline registry device (104), execution metadata repository device (106), and/or task image registry device (108) may include multiple different storage units and/or devices. The multiple different storage units and/or devices may or may not be of the same type or located at the same physical site.

In one or more embodiments, the pipeline execution service device (102) includes one or more pipeline execution services (124). Each pipeline execution service (124) may include functionality to centralize, in a consistent manner, the execution of tasks (154A, 154N) in a pipeline (152) for an application (150). For example, the pipeline execution service (124) may be a continuous integration and/or continuous delivery service, such as Jenkins. The application (150) may be any software application used by multiple users (e.g., over a network). For example, the application (150) may be an inventory, production, or logistics management application, a personal financial management application, such as Mint®, or a business management applications, such as Intuit® QuickBooks Online® (Mint, Intuit, and QuickBooks Online are trademarks of Intuit, Inc., Mountain View, Calif.). In one or more embodiments, a pipeline (152) is a continuous integration and/or continuous delivery pipeline. For example, a pipeline (152) may be a development pipeline, a production pipeline, a deployment pipeline, etc.

In one or more embodiments, the pipeline registry device (104) includes a pipeline registry (120). The pipeline registry (120) may include one or more tasks (154A, 154N), task registration metadata (156A, 156N), and execution rules (158) for each pipeline (152). Each task (154A) may be a unit of work. The task (154A) may be submitted to the pipeline registry (120) by a task developer. For example, a task (154A) may be executable code, such as a suite of tests, where each test is software or application specific hardware configured to test an application (150). In one or more embodiments, the pipeline registry (120) includes functionality to register a task (154A) with one or more pipelines. Each task (154A) may be associated with task registration metadata (156A) that describes attributes of the corresponding task (154A). In one or more embodiments, the pipeline registry device (104) includes functionality to obtain task registration metadata (156A) from a task image (162) corresponding to a task (154A).

Figure 1B:
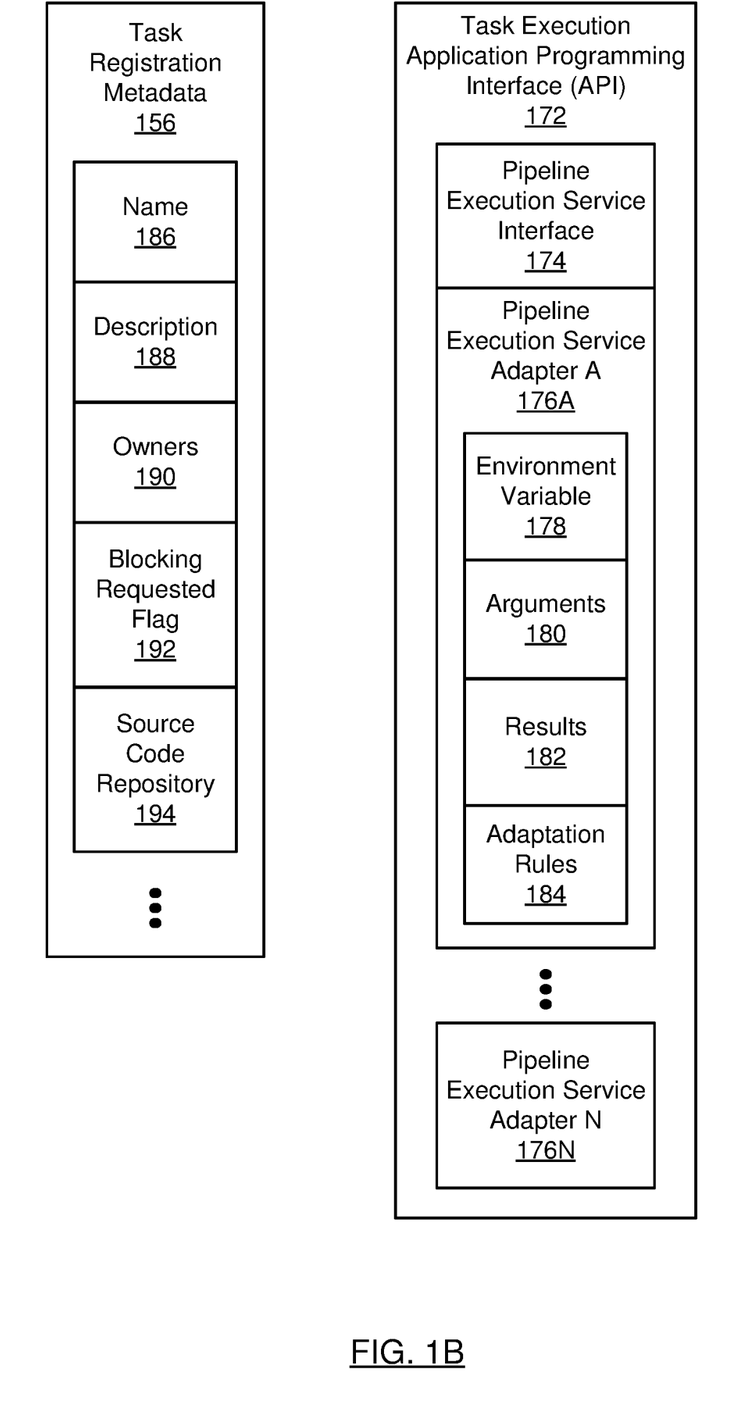

Turning to FIG. 1B, in one or more embodiments, task registration metadata (156) includes values for the following attributes: a name (186), a description (188), one or more owners (190), a blocking requested flag (192), a source code repository (194), and/or additional attributes associated with a task. The name (186) may be an identifier associated with the task corresponding to the task registration metadata (156). The description (188) may be a detailed description of the corresponding task. The owners (190) may be one or more points of contact responsible for the corresponding task. For example, the owners (190) may be represented as an email address for one or more individuals or groups. The blocking requested flag (192) may indicate whether an execution mode of "blocking" has been requested for the corresponding task. In one or more embodiments, unsuccessful execution of a task whose execution mode is "blocking" will halt the pipeline in which the task was executing. The source code repository (194) may specify a location where source code for the task is stored. For example, the location may be a file in persistent storage (e.g., persistent storage (506) of a computing system (500)).

In one or more embodiments, additional attributes associated with the task include: registry, context, application uniform resource locator (URL), application version, run number, build URL, image path and/or image version. The registry may be an identifier of the registry (e.g., task image registry (128)) that stores the task image (162) corresponding to the task. The context may be a pipeline in which the task is being run. For example, different portions of the executable code (168) (e.g., corresponding to different tests in a test suite) of the task image (162) may be run depending on the pipeline running the task. The application URL may be the URL to the application (150) to which the task is applied. The application version may be the version number of the application (150) to which the task is applied. The run number may identify the specific run of the pipeline that is running (or ran) the task. The build URL may be the URL (e.g., a Jenkins build URL) to the build job running the task. The image path may be the path (e.g., a full Docker image path) of the task image (162) corresponding to the task. The image version may be the version number of the task image (162) corresponding to the task. In addition, the task registration metadata (156) may include other attributes, such as: resources required, resource constraints (e.g., a memory usage constraint), preconditions (e.g., conditions required to be satisfied before executing the task), execution deadline, input constraints, output constraints, etc.

Returning to FIG. 1A, the tasks (154A, 154N) of a pipeline (152) may be executed according to the execution rules (158) for the corresponding pipeline (152). In one or more embodiments, the execution rules (158) are global rules that apply to all pipelines managed by the pipeline execution service (124). Alternatively, each pipeline (152) may specify its own pipeline-specific execution rules (158). The execution rules (158) may specify validation requirements for tasks (154A, 154N) to satisfy prior to execution. In addition, the execution rules (158) may assign priorities to the tasks (154A, 154N), may specify how to sequence the execution of the tasks (154A, 154N), may specify how to determine the execution mode, stability and/or execution success/failure criteria, etc. of the tasks (154A, 154N). The execution rules (158) may be based on dependencies among the tasks (154A, 154N). For example, dependencies may be used to prioritize and/or sequence the tasks (154A, 154N). Continuing this example, the dependencies may indicate sequential constraints among the tasks (154A, 154N) that require a task to be executed before or after executing another task. As another example, the priority of one task may depend on whether another task has been successfully executed. In addition, the priority of a task may be based on the results of executing the task, as described below.

Figure 1C:
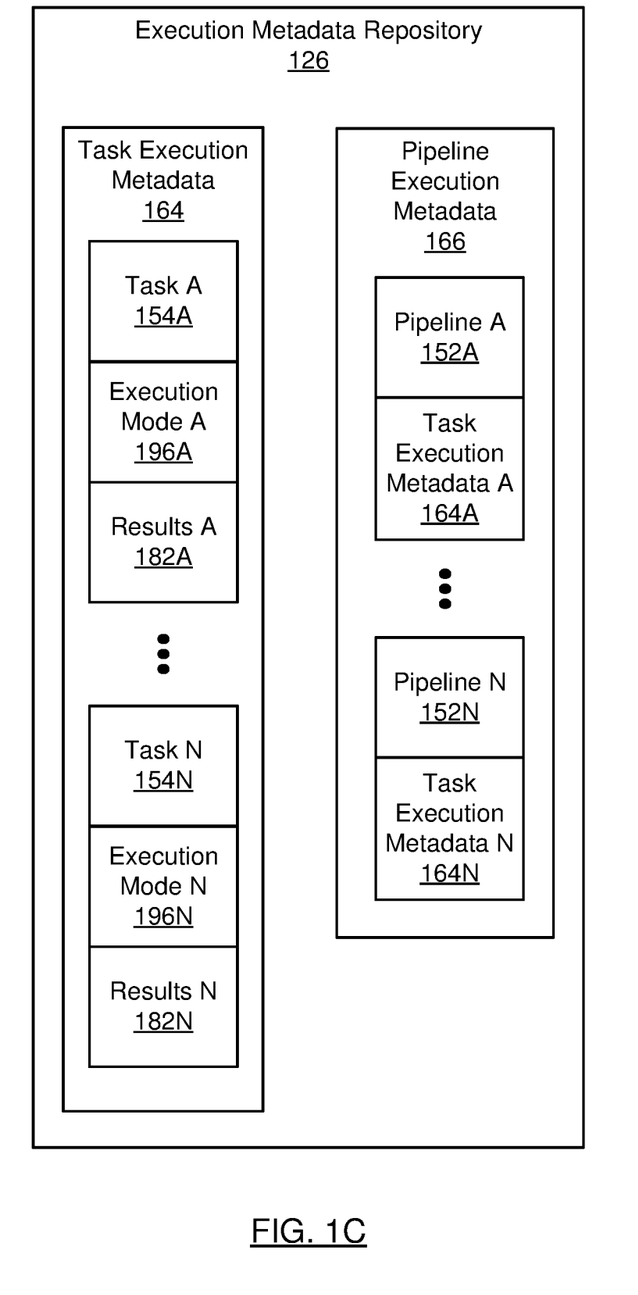

In one or more embodiments, the execution metadata repository device (106) includes an execution metadata repository (126). Turning to FIG. 1C, the execution metadata repository (126) may include task execution metadata (164) and pipeline execution metadata (166). The task execution metadata (164) may include, for each task (154A, 154N): an execution mode (196A, 196N), and results (182A, 182N) (e.g., results obtained via the task application programming interface (API) (172)). In one or more embodiments, the execution mode (196A) indicates whether unsuccessful execution of the corresponding task (154A) halts execution of the pipeline that includes the task (154A). In one or more embodiments, the execution mode (196A) is a flag that is set to "blocking" or "non-blocking". The execution mode (196A) may be assigned based on the stability of the corresponding task. In other words, unsuccessful execution of a stable task may be indicative of a serious problem, and thus the pipeline that includes the unsuccessfully executed stable task may be halted. In contrast, unsuccessful execution of an unstable task may not indicate a serious problem, and thus the pipeline that includes the unsuccessfully executed unstable task may continue execution. For example, the execution rules (158) may specify that a task that has been executed successfully 10 times in a row (e.g., according to the results (182A) corresponding to the task) is stable, and a task that has been executed unsuccessfully three times in a row is unstable. The results (182A) for a task (154A) may include task outputs, errors, activity logs, status codes (e.g., pass/fail codes, error codes, timeouts, etc.), execution duration, error logs, resources used, whether unsuccessful execution of the task blocked the pipeline containing the task, etc. In one or more embodiments, the results (182A) for the task (154A) include a series of results due to executing the task (154A) at different points in time and/or executing the task (154A) in different pipelines (152). In one or more embodiments, the task execution metadata (164) is used by the pipeline execution service (124) to determine whether the corresponding task is sufficiently stable for execution.

In one or more embodiments, as described above, the priority of a task (154A) may be based on the results (182A) corresponding to the task. For example, the priority may be based on an average duration of the task, or the stability of the task. Continuing this example, the stability may be measured based on the number of successful executions of the task and the number of failed executions of the task.

In one or more embodiments, the pipeline execution metadata (166) may include task execution metadata (164A, 164N) for each pipeline (152A, 152N). In other words, the pipeline execution metadata (166) may include task execution metadata (164A) corresponding to each task (154A, 154N) of a pipeline (152A). The execution metadata repository (126) may include pipeline execution metadata (166) corresponding to pipelines (152A, 152N) managed by multiple pipeline execution services (124).

Returning to FIG. 1A, in one or more embodiments, the pipeline execution service (124) is implemented in hardware (e.g., circuitry), software, firmware, and/or any combination thereof. The pipeline execution service (124) may include functionality to validate that a task (154A) in a pipeline (152) complies with a contract before executing the task (154A). In one or more embodiments, the contract is specific to a pipeline (152). Alternatively, the contract may be specific to the pipeline execution service (124). The pipeline execution service (124) may use the execution rules (158) (e.g., obtained from the pipeline registry (120)) for the pipeline (152) to validate that the task (154A) complies with the contract. In one or more embodiments, the contract specifies requirements to be satisfied by the task registration metadata (156A) corresponding to the task (154A) prior to executing the task (154A). For example, the contract may specify that the task registration metadata (156A) specify an owner (190) and/or a source code repository (194). In addition, the contract may specify execution requirements to be satisfied prior to storing the results (182) of executing the task (154A) in the execution metadata repository (126). For example, an execution requirement may specify that the results (182) be stored in a specific format. As another example, an execution requirement may specify that execution be completed within a time limit.

In one or more embodiments, the pipeline execution service (124) includes functionality to obtain execution metadata (e.g., from the execution metadata repository (126)) for a task. The pipeline execution service (124) may include functionality to request (e.g., via the task execution API (172)) execution of a task image (162). The pipeline execution service (124) may include functionality to obtain execution results (182) (e.g., via the task execution API (172)) from the task image (162).

In one or more embodiments, the task image registry device (108) includes a task image registry (128). The task image registry (128) may store a task image (162) for each task (154). The task (154) may be executed by executing the corresponding task image (162). For example, the task image (162) may be a Docker image that may be run in a Docker-enabled environment.

In one or more embodiments, the task image (162) includes executable code (168), an execution environment (170), task registration metadata (156), and a task application programming interface (API) (172). In one or more embodiments, the executable code (168) may be a collection of object code (e.g., generated by a compiler). For example, the executable code (168) may be dynamically linked code or an archive file that packages compiled components. In one or more embodiments, the execution environment (170) includes software components needed to execute the executable code (168). For example, the execution environment (170) may include libraries, frameworks, and any other technologies upon which the executable code (168) depends (e.g., no additional installation, customization or resources are required to execute the executable code (168)).

In one or more embodiments, the task image (162) is a customized image that includes customized executable code (168) and/or a customized execution environment (170). For example, the executable code (168) may be customized to execute one or more portions of the executable code (168) (e.g., one or more tests of a test suite). Continuing this example, the one or more portions of the executable code (168) may be relevant to a specific pipeline (152) (e.g., a deployment pipeline). Similarly, the execution environment (170) may be customized to include specific software components. The customization may integrate knowledge learned during the lifecycle of the task corresponding to the task image (162) (e.g., as a series of results (182) corresponding to the task are accumulated and analyzed).

Returning to FIG. 1B, in one or more embodiments, the task execution API (172) includes a pipeline execution service interface (174) and one or more pipeline execution service adapters (176A, 176N). The pipeline execution service interface (174) may include functionality to communicate between the task image (162) and the pipeline execution service adapters (176A, 176N). The pipeline execution service interface (174) may include method or subroutine names, communication protocols to use for the communication, the format for data transmitted in the communication, etc. that the pipeline execution service interface (174) requires in order to process a communication received from a pipeline execution service adapter (176A). The pipeline execution service interface (174) is independent of any specific pipeline execution service (124) in the sense that the pipeline execution service interface (174) may not require modification when adding a new pipeline execution service (124) or when requirements of an existing pipeline execution service (124) are modified.

In one or more embodiments, a pipeline execution service adapter (176A) includes functionality to communicate between the pipeline execution service interface (174) and a specific pipeline execution service (124). The pipeline execution service adapter (176A) may include an environment variable (178), arguments (180), results (182), and adaptation rules (184). In one or more embodiments, the environment variable (178) corresponds to a directory in a file system. For example, the file system may reside in the pipeline execution service device (102) that includes the pipeline execution service (124). The environment variable (178) may be used (e.g., by the pipeline execution service adapter (176A) corresponding to the pipeline execution service (124)) to locate the directory. For example, the environment variable (178) may indicate a path to the directory in the file system. Alternatively, in one or more embodiments, the environment variable (178) corresponds to a network call to a data storage service. Still alternatively, the environment variable (178) may correspond some other mechanism for storing data.

In one or more embodiments, the arguments (180) include values for one or more attributes. The arguments (180) may be represented as a series of name/value pairs (e.g., in a JavaScript Object Notation (JSON) file). For example, the arguments (180) may include values for one or more of the following attributes, as well as any number of additional attributes:

a. registry
b. context (e.g., the pipeline (152) in which the task is being executed)
c. flags (e.g., to specify verbose results (182) that include detailed metrics pertaining to execution of the task image (162))
d. application URL
e. application version
f. run number
g. build URL
h. name
i. image path
j. image version In one or more embodiments, the results (182) include values for one or more attributes. The results (182) may be represented as a series of name/value pairs (e.g., in a JSON file). For example, the results (182) may include values for one or more of the following attributes: task outputs, errors, activity logs, error logs, status codes (e.g., pass/fail codes, error codes, timeouts, etc.), execution duration, resources used, whether unsuccessful execution of the task blocked the pipeline containing the task, etc. Continuing this example, the results (182) may also include additional data that may be useful for logging and/or debugging purposes. In one or more embodiments, a contract requires that the results (182) include values for specific attributes. In one or more embodiments, a contract requires that the results (182) include values in a specific format. For example, the contract may specify that a "date" attribute is required to have a value that is interpreted according to the MM/DD/YY format.

In one or more embodiments, the executing task image (162) (e.g., a container) and the pipeline execution service adapter (176A) communicate using the directory. For example, the pipeline execution service adapter (176A) may include functionality to place arguments (180) (e.g., arguments received from a pipeline execution service (124)) in the directory. The arguments (180) may be used by the task image (162) when executing the executable code (168). Similarly, the task image (162) may include functionality to place results (182) in the directory to be accessed by the pipeline execution service adapter (176A). For example, the pipeline execution service adapter (176A) may send the results (182) to the pipeline execution service (124). Alternatively, the arguments (180) and the results (182) may be sent to a data storage service using a network call indicated in the environment variable (178).

In one or more embodiments, the adaptation rules (184) modify the arguments (180) to comply with one or more execution requirements specified by a pipeline execution service (124). In one or more embodiments, the adaptation rules (184) modify the results (182) to comply with one or more execution requirements specified by a pipeline execution service (124). For example, an adaptation rule (184) may set a flag in the arguments (180) indicating that results (182) are to be provided in a specific format or that results (182) include various detailed execution metrics. As another example, an adaptation rule (184) may convert results (182) into a format required by a pipeline execution service (124). For example, the format may require that the results (182) include a specific attribute name. Alternatively, the format may require that the results (182) include a specific type of attribute value. The pipeline execution service adapter (176A) may include a conversion table that maps a name of an attribute included in the results (182) to an alternate attribute name (e.g., a name that is recognized by the pipeline execution service (124)). For example, the conversion table may map a value (e.g., an error or status code)

included in the results (182) to an alternate value. As yet another example, the alternate value may be an equivalent value of a different type, such as a timestamp or duration represented in an alternate format, or a decimal equivalent of a binary number.

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
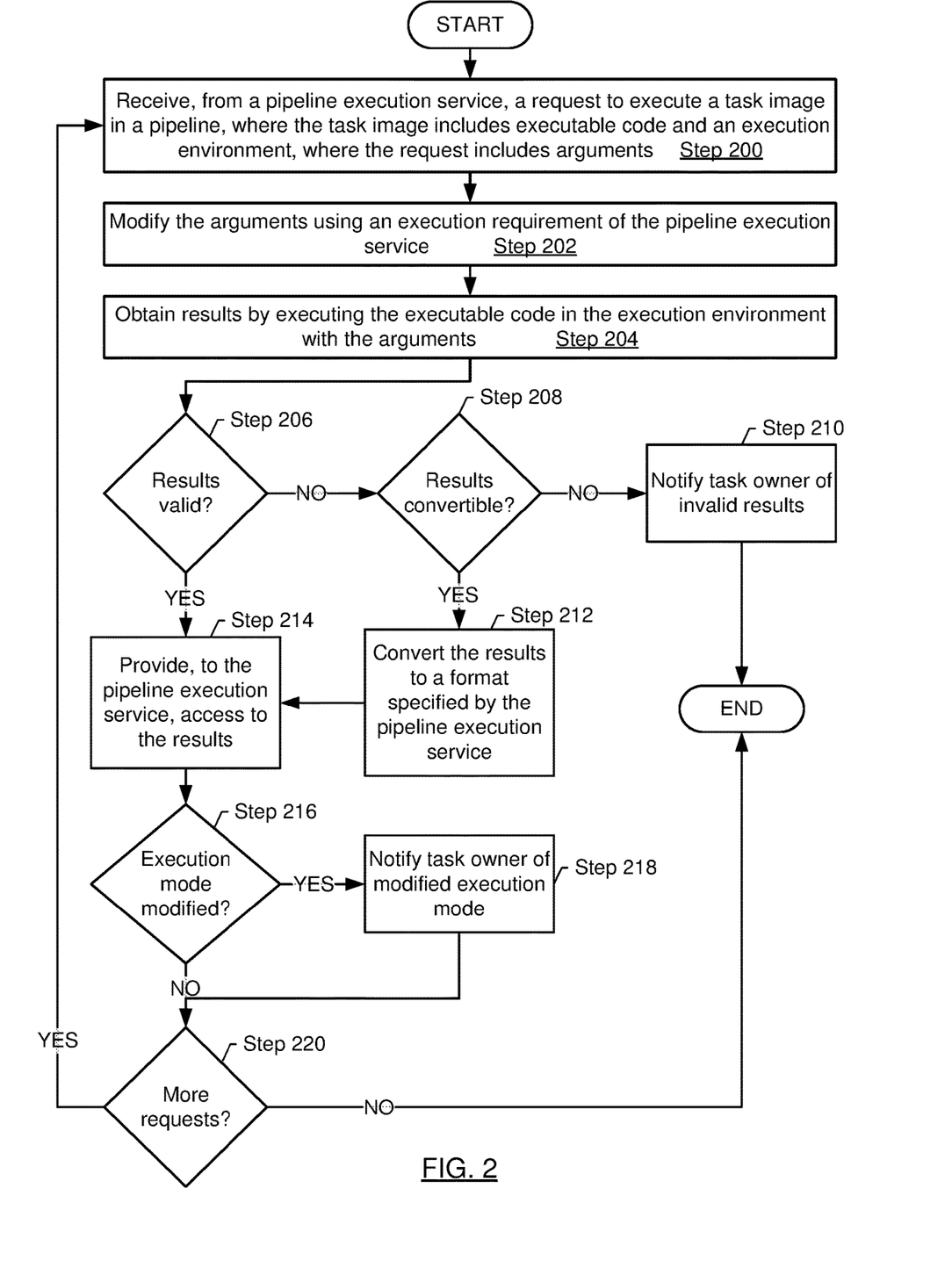
FIG. 2 shows a flowchart of a method in accordance with one or more embodiments of the invention.

FIG. 2 shows a flowchart in accordance with one or more embodiments of the invention. The flowchart depicts a process for task execution. One or more of the steps in FIG. 2 may be performed by the components (e.g., the task execution application programming interface (API) (172) and the pipeline execution service (124)) of the system (100)) discussed above in reference to FIG. 1A and FIG. 1B. In one or more embodiments, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a request to execute a task image in a pipeline is received from a pipeline execution service. The task image may include executable code and an execution environment, and the request may include arguments. In one or more embodiments, the task execution application programming interface (API) receives the request. For example, the pipeline execution service adapter corresponding to the pipeline execution service may receive the request. In one or more embodiments, the pipeline execution service adapter stores the arguments in the directory corresponding to the environment variable for the pipeline execution service adapter.

The pipeline execution service adapter may receive the request after registration metadata of the task image is validated. The pipeline execution service adapter may validate the registration metadata using a registration requirement of the pipeline execution service. For example, the registration requirement may require that task registration metadata include an owner, a description, and a source code repository for the corresponding task.

In Step 202, the arguments are modified using an execution requirement of the pipeline execution service. For example, the execution requirement may require that results be provided in a verbose format that includes detailed metrics pertaining to execution of the task image. Continuing this example, the verbose format may specify resources consumed during execution of the task image, such as the amount of memory allocated, the number of objects created and/or a measure of central processing unit (CPU) utilization. The task execution API may apply an adaptation rule to modify the arguments to satisfy the execution requirement. For example, the adaptation rule may set a flag in the arguments indicating that results be generated in the verbose format.

In Step 204, results are obtained by executing the executable code in the execution environment with the arguments. The task image may obtain the arguments from the directory. Alternatively, the task image may obtain the arguments from a data storage service. Different portions of the executable code may be executed depending on the arguments. For example, different portions of the executable code may be executed depending on a pipeline specified in the arguments. Alternatively, different portions of the executable code may be executed when the arguments indicate that the results be provided in a specific format. For example, if the specific format requires metrics on memory utilization, then additional code may be executed to instrument memory management functions to provide the memory utilization metrics.

In one or more embodiments, the task image stores the results in the directory corresponding to the environment variable for the pipeline execution service adapter. The task execution API may obtain the results from the directory. For example, the results may be obtained by the pipeline execution service adapter corresponding to the pipeline execution service.

Alternatively, in one or more embodiments, the task image stores the results at a data storage service. The task execution API may obtain the results from the data storage service.

In one or more embodiments, the pipeline execution service adapter terminates execution of the executable code when a time limit specified by the pipeline execution service has been exceeded.

If, in Step 206, it is determined that the results obtained in Step 204 above are valid, then Step 214 below is executed. In one or more embodiments, the task execution API determines that the results are valid when the results satisfy the execution requirement(s) specified by the pipeline execution service. For example, an execution requirement may specify that the results be stored in a specific format or that execution be completed within a time limit Otherwise, if Step 206 determines that the results are invalid, then Step 208 below is executed.

If, in Step 208, it is determined that the results obtained in Step 204 above are convertible to a format that satisfies the execution requirement(s) specified by the pipeline execution service, then Step 212 below is executed. In one or more embodiments, the task execution API determines that the results are convertible when the results may be converted to a format satisfying the execution requirement(s) specified by the pipeline execution service (see description of Step 212 below). Otherwise, if Step 208 determines that the results are not convertible, then Step 210 below is executed.

In Step 210, the task owner (e.g., an owner specified in task registration metadata associated with the task image) is notified of the invalid results.

In Step 212, the results are converted to a format that satisfies the execution requirement(s) specified by the pipeline execution service. For example, the task execution API may use a conversion table to map an attribute name or value (e.g., an error or status code) included in the results to an alternate name or value that is recognized by the pipeline execution service. Continuing this alternate example, the alternate value may be an equivalent value of a different type, such as a timestamp or duration represented in an alternate format.

In Step 214, access to the results is provided to the pipeline execution service. For example, the task execution API may alert the pipeline execution service regarding the availability of the results, and may provide the pipeline execution service access to the directory that stores the results. The pipeline execution service may then write the results to the execution metadata repository.

If, in Step 216, a notification of a modified execution mode associated with the task image is received, then in Step 218 the owner of the task image is notified of the modified execution mode. The pipeline execution service may control the execution of the pipeline by modifying the execution mode based on applying execution rules to the current results obtained in Step 204 above, combined with previous results included in task execution metadata in the execution metadata repository. For example, the execution rules may assign the execution mode "blocking" if the task image has been executed successfully 10 times in a row. Continuing this example, if the previous results indicate that the task image has been executed successfully 9 times in a row, and the current results indicate that the task image has been executed successfully, then the pipeline execution service may modify the execution mode from "non-blocking" to "blocking". As an alternative example, the execution rules may assign the execution mode "non-blocking" if the task image has been executed unsuccessfully 3 times in a row. Continuing this example, if the previous results indicate that the task image has been executed unsuccessfully 2 times in a row, and the current results indicate that the task image has been executed unsuccessfully, then the pipeline execution service may modify the execution mode from "blocking" to "non-blocking". As another example, the pipeline execution service may control the execution of the pipeline by assigning priorities to one or more tasks in the pipeline based on applying execution rules to the current results obtained in Step 204 above, combined with previous results included in task execution metadata in the execution metadata repository. In one or more embodiments, the notification sent by pipeline execution service to the owner of the task image in Step 218 may request the task owner to address the continued unsuccessful execution of the task image. For example, the task may be a test suite that executed unsuccessfully due to a defect in the application being tested, and the notification sent in Step 218 may ask the owner of the task to debug and modify the application so that the test suite executes successfully.

In one or more embodiments, the notification relates to an aspect of task execution metadata other than the execution mode.

If, in Step 220, it is determined that there are additional requests to execute the task image, then Step 200 above is again executed to process the next request. The requests may be received from the same pipeline execution service, or may be received from different pipeline execution services.

Figure 3A:
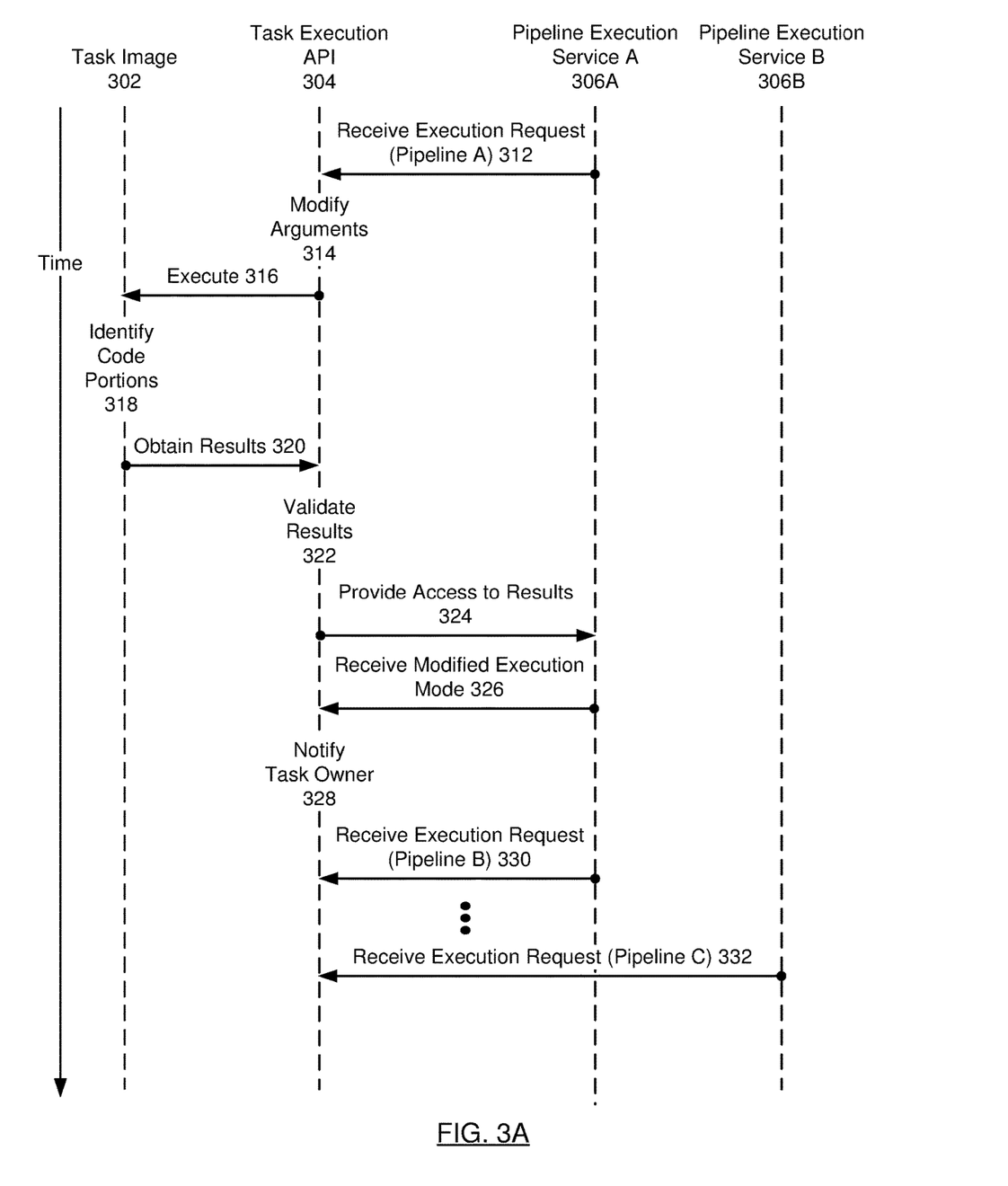
FIG. 3A, FIG. 3B, FIG. 3C, FIG. 3D, and FIG. 4 show a flow diagram of examples in accordance with one or more embodiments of the invention.

The following example is for explanatory purposes only and not intended to limit the scope of the invention. FIG. 3A, FIG. 3B, FIG. 3C, FIG. 3D, and FIG. 3E show an implementation example in accordance with one or more embodiments of the invention. FIG. 3A illustrates, in accordance with one or more embodiments, the relative timing of steps performed by one or more components described in reference to FIG. 1A, FIG. 1B, and FIG. 1C, in accordance with the flowchart in FIG. 2. These components include: a task image (302) ((162) in FIG. 1A), a task execution application programming interface (API) (304) ((172) in FIG. 1A and FIG. 1B), and pipeline execution services (306A, 306B) ((124) in FIG. 1A). The task image (302) performs a suite of tests used during the testing of a financial management application.

Figure 3B:
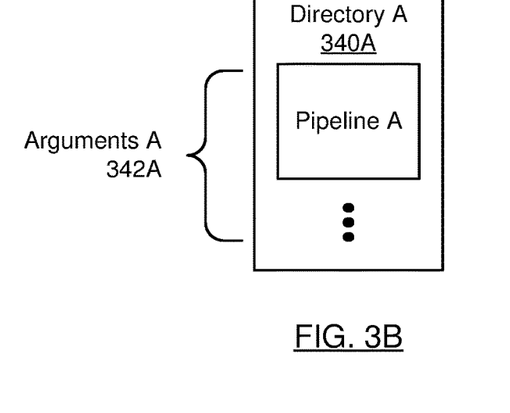

As shown in FIG. 3A, initially, in Step 312, the task execution API (304) receives a request from pipeline execution service A (306A) to execute the task image (302). As shown in FIG. 3B, the task execution API (304) stores the arguments (342A) of the request in directory A (340A). Directory A (340A) resides in the file system of the computer system running pipeline execution service A (306A). The task execution API (304) locates directory A (340A) using an environment variable ((178) in FIG. 1B) that corresponds to pipeline execution service A (306A). The arguments (342A) indicate that the task image (302) is to be executed in the context of pipeline A, which is a pre-production pipeline for the financial management application.

Figure 3C:
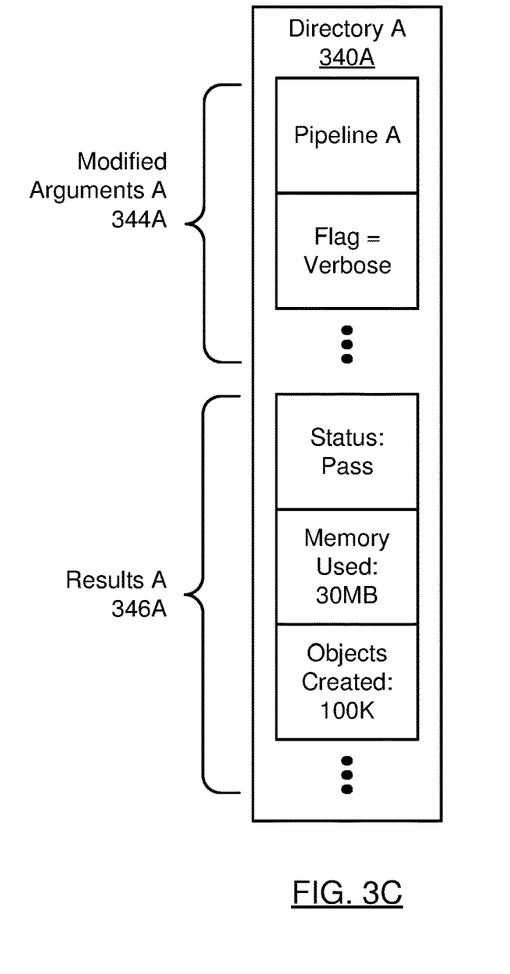

In Step 314, the task execution API (304) modifies the arguments (342A) using an execution requirement of pipeline execution service A (306A) that requires execution results be provided in a verbose format. The verbose format specifies resources consumed during execution of the task image, including the amount of memory allocated and the number of objects created. As shown in FIG. 3C, the task execution API (304) (e.g., the pipeline execution service adapter corresponding to the pipeline execution service A (306A)) sets a flag in the modified arguments (344A) indicating that results be generated in the verbose format.

In Step 316, the task execution API (304) executes the task image (302) with the modified arguments (344A).

In Step 318, the task image (302) uses the modified arguments (344A) to identify which tests in the test suite to execute. In this case, since pipeline A is a pre-production pipeline, the task image (302) executes the tests in the test suite that are included in a pre-production list of tests. In addition, since the modified arguments (344A) specify that the verbose format be used for the execution results, portions of the executable code that track memory allocation and object creation are executed. The task image (302) stores the execution results (346A) in directory A (340A), as shown in FIG. 3C.

In Step 320, the task execution API (304) obtains the execution results (346A) from directory A (340A).

In Step 322, the task execution API (304) determines that the results (346A) are valid. That is, the task execution API (304) determines that the results (346A) satisfy the execution requirement(s) specified by pipeline execution service A (306A). For example, the results (346A) are in the verbose format required by pipeline execution service A (306A).

In Step 324, the task execution API (304) provides, to pipeline execution service A (306A), access to the results (346A). In this case, the task execution API (304) alerts the pipeline execution service A (306A) to the availability of the results (346A) in directory A (340A).

In Step 326, the task execution API (304) receives a notification from pipeline execution service A (306A) of a modified execution mode associated with the task image (302). In this case, the pipeline execution service A (306A) modifies the execution mode to "blocking" due to the task image (302) being executed successfully 10 times in a row. Pipeline execution service A (306A) bases the modified execution mode on the results (346A) combined with previous results included in task execution metadata ((164) in FIG. 1C) in the execution metadata repository ((126) in FIG. 1A and FIG. 1C).

In Step 328, the task execution API (304) notifies the owner of the task image (302) of the modified execution mode.

Figure 3D:
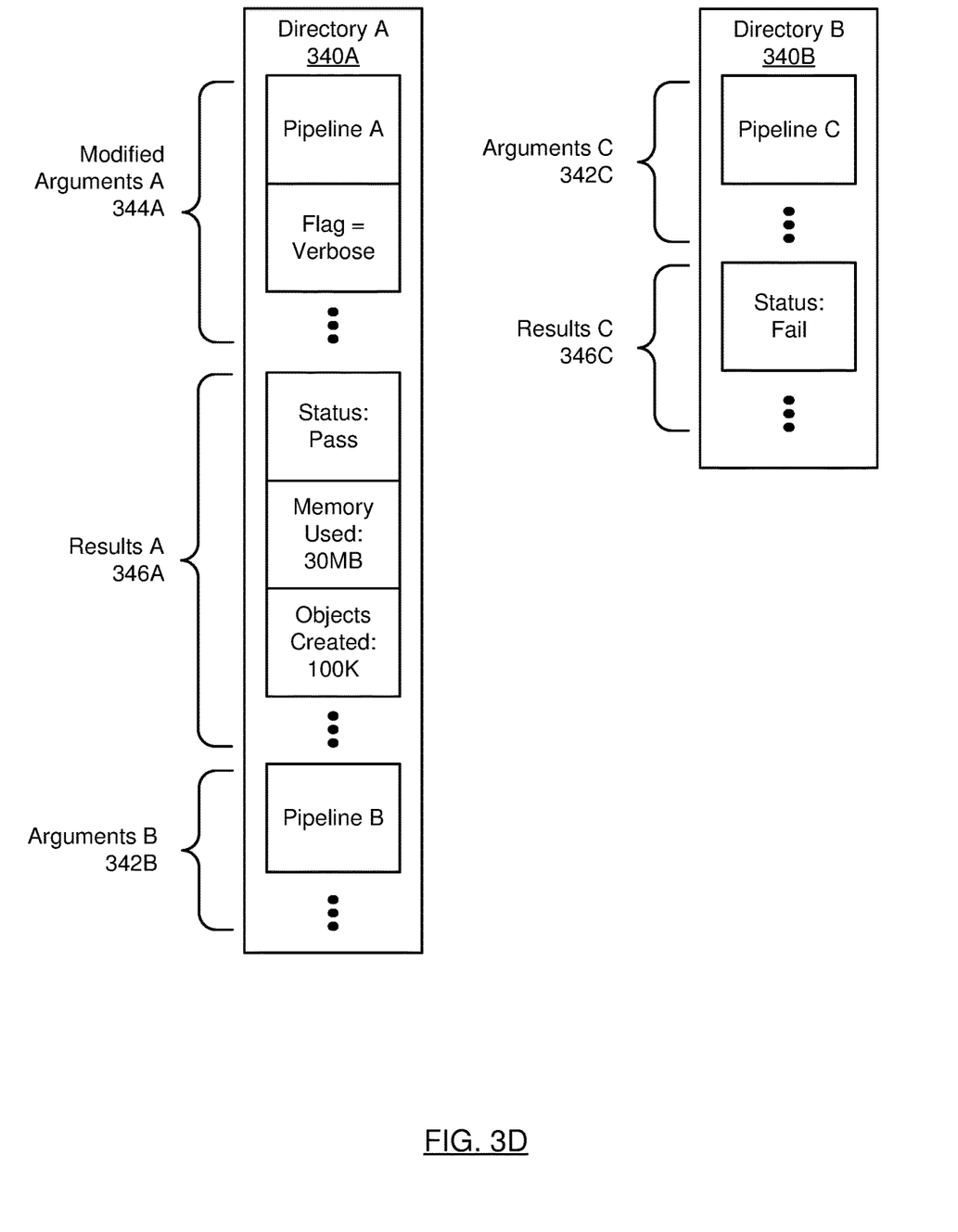

In Step 330, the task execution API (304) receives another request from pipeline execution service A (306A) to execute the task image (302). As shown in FIG. 3D, the task execution API (304) stores the arguments (342B) of this second request in directory A (340A). The arguments (342B) indicate that the task image (302) is to be executed in the context of pipeline B, which is a deployment pipeline for the financial management application. The second request from pipeline execution service A (306A) is then processed similarly to the processing of the first request of Step 312 above.

In Step 332, the task execution API (304) receives a request from pipeline execution service B (306B) to execute the task image (302). As shown in FIG. 3D, the task execution API (304) stores the arguments (342C) in directory B (340B), which resides in the file system of the computer system running pipeline execution service B (306B). In this case, the same computer system is running both pipeline execution service A (306A) and pipeline execution service B (306B). The task execution API (304) locates directory B (340B) using an environment variable that corresponds to pipeline execution service B (306B). The arguments (342C) indicate that the task image (302) is to be executed in the context of pipeline C, which is another pipeline for testing the financial management application.

Figure 4:
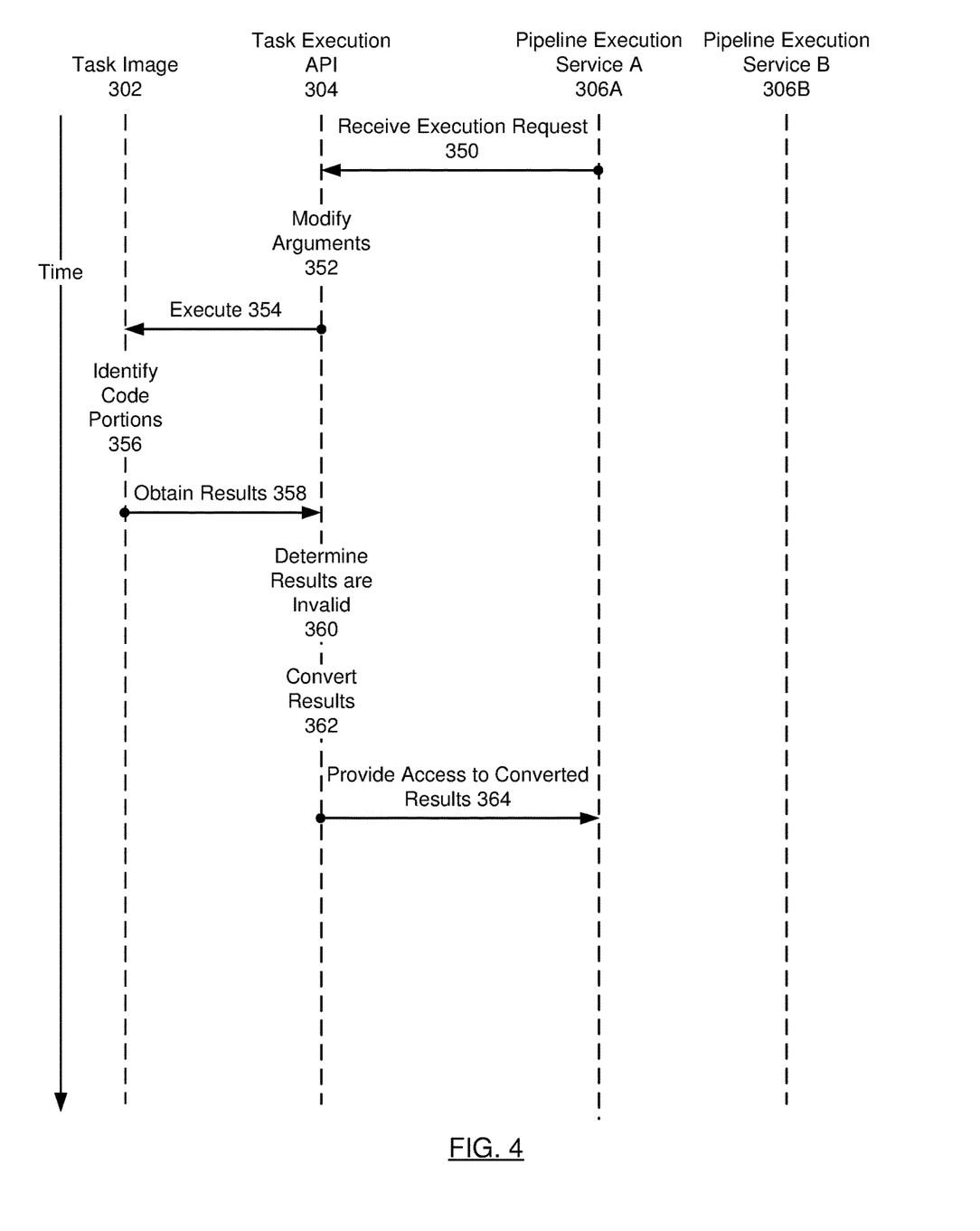

FIG. 4 shows, in accordance with one or more embodiments, an alternate scenario with an alternate timing of steps performed by one or more components described in reference to FIG. 1A, FIG. 1B, and FIG. 1C, in accordance with the flowchart in FIG. 2. As shown in FIG. 4, initially, in Step 350, the task execution API (304) receives a request from pipeline execution service A (306A) to execute the task image (302). See description of Step 312 above.

In Step 352, the task execution API (304) modifies the arguments (342A) using an execution requirement of pipeline execution service A (306A) that requires execution results be provided in a "verbose" format (see description of Step 314 above).

In Step 354, the task execution API (304) executes the task image (302) with the modified arguments (344A).

In Step 356, the task image (302) uses the modified arguments (344A) to identify which tests in the test suite to execute (see description of Step 318 above).

In Step 358, the task execution API (304) obtains the execution results (346A) (see description of Step 320 above).

In Step 360, the task execution API (304) determines that the results (346A) are invalid because the results (346A) are not represented in the format required by pipeline execution service A (306A).

In Step 362, the task execution API (304) converts the results (346A) by converting an error code included in the results (346A) to an error code recognized by pipeline execution service A (306A). The task execution API (304) also adjusts the format of timestamps included in the results (346A) to comply with the timestamp format required by pipeline execution service A (306A).

In Step 364, the task execution API (304) provides, to pipeline execution service A (306A), access to the converted results (see description of Step 324 above).

Figure 5A:
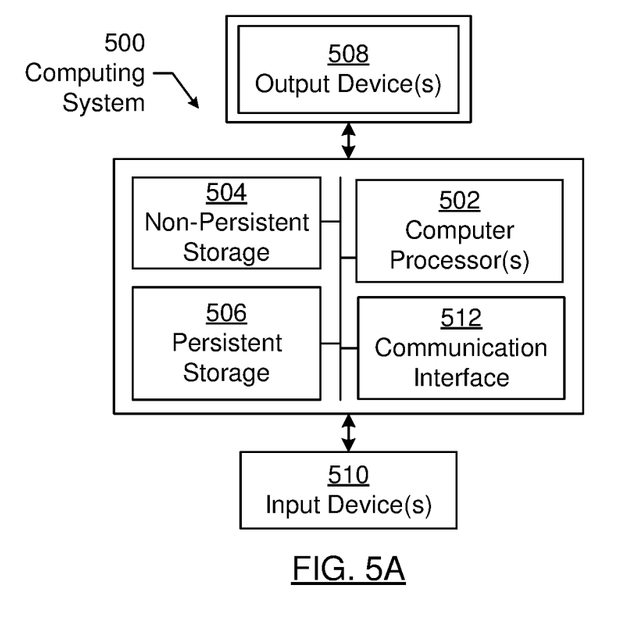
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
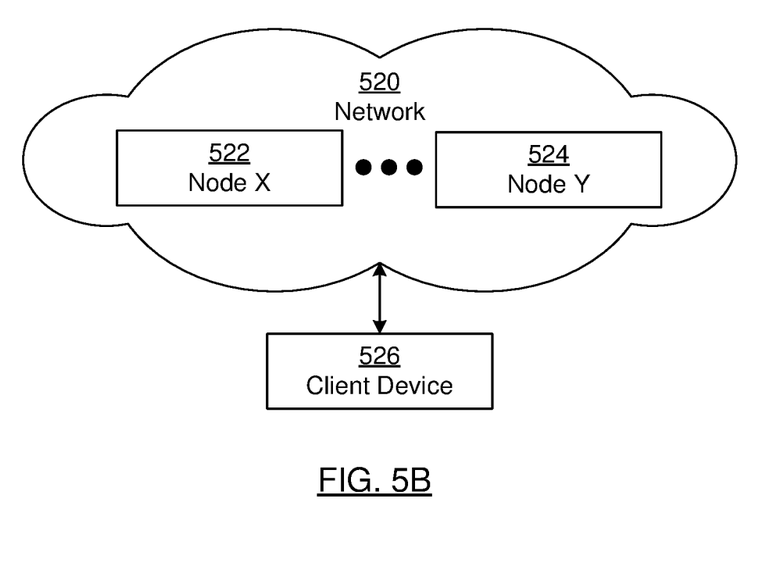

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A task execution application programming interface, comprising:
    a pipeline execution service interface configured to:
        communicate between a task image and a first pipeline execution service adapter,
            wherein the first pipeline execution service adapter is configured to:
                receive, from a first pipeline execution service, a first request to execute the task image in a first pipeline, wherein the first request comprises first arguments, and
                wherein the task image comprises executable code and an execution environment, and
            obtain first results by executing the executable code using the first arguments in the execution environment,
                wherein the first pipeline execution service adapter is further configured to provide, to the first pipeline execution service, access to the first results, and
                wherein the first pipeline execution service controls execution of the first pipeline using the first results; and
    the first pipeline execution service adapter for communicating between the pipeline execution service interface and the first pipeline execution service.

2. The task execution application programming interface of claim 1, wherein the task image determines, using the first arguments, one or more portions of the executable code to execute.

3. The task execution application programming interface of claim 1, wherein the first pipeline execution service adapter is further configured to modify the first arguments using an execution requirement of the first pipeline execution service.

4. The task execution application programming interface of claim 1, wherein the task image further comprises an owner, and wherein the first pipeline execution service adapter is further configured to:
determine that the first results violate an execution requirement of the first pipeline execution service, and
notify the owner that the first results violate the execution requirement.

5. The task execution application programming interface of claim 1, wherein the first pipeline execution service adapter is further configured to:
determine that the first results violate an execution requirement of the first pipeline execution service, and
convert the first results to a format that satisfies the execution requirement.

6. The task execution application programming interface of claim 1, further comprising a second pipeline execution service adapter for communicating between the pipeline execution service interface and a second pipeline execution service,
wherein the second pipeline execution service adapter is configured to receive, from the second pipeline execution service, a second request to execute the task image in a second pipeline, wherein the second request comprises second arguments,
wherein the pipeline execution service interface is further configured to obtain the second results by executing the executable code using the second arguments in the execution environment, and
wherein the first pipeline execution service further controls execution of the first pipeline using the second results.

7. The task execution application programming interface of claim 1, wherein the task image further comprises an owner, and wherein the first pipeline execution service adapter is further configured to:
receive, from the first pipeline execution service, a notification of a modification to an execution mode associated with the task image, wherein controlling the execution of the first pipeline further comprises modifying the execution mode associated with the task image, and
notify the owner of the modification to the execution mode.

8. A task execution application programming interface, comprising:
a pipeline execution service interface configured to communicate with a task image comprising executable code and an execution environment; and
a first environment variable corresponding to a first directory, wherein the task execution application programming interface is configured to:
provide, to a first pipeline execution service, access to the first directory,
receive, from the first pipeline execution service, a first request to execute the task image in a first pipeline, wherein the first request comprises first arguments, and
obtain first results by executing the executable code using the first arguments in the execution environment,
wherein the first pipeline execution service stores the first arguments in the first directory, and
wherein the task image stores the first results in the first directory.

9. The task execution application programming interface of claim 8, further configured to modify the first arguments using an execution requirement of the first pipeline execution service.

10. The task execution application programming interface of claim 8, wherein the task image further comprises an owner, and wherein the task execution application programming interface is further configured to:
determine that the first results violate an execution requirement of the first pipeline execution service, and
notify the owner that the first results violate the execution requirement.

11. The task execution application programming interface of claim 8, further configured to:
determine that the first results violate an execution requirement of the first pipeline execution service, and
convert the first results to a format that satisfies the execution requirement.

12. The task execution application programming interface of claim 8, wherein the first directory resides in a file system of a computer system comprising the task image.

13. The task execution application programming interface of claim 8, further comprising a second environment variable corresponding to a second directory,
wherein the task execution application programming interface is further configured to:
provide, to a second pipeline execution service, access to the second directory,
receive, from the second pipeline execution service, a second request to execute the task image in a second pipeline, wherein the second request comprises second arguments, and
obtain second results by executing the executable code using the second arguments in the execution environment, and
wherein the second pipeline execution service stores the second arguments in the second directory.

14. The task execution application programming interface of claim 8, wherein the task image further comprises an owner, and wherein the task execution application programming interface is further configured to:
provide, to the first pipeline execution service, access to the first results;
receive, from the first pipeline execution service, a notification of a modification to an execution mode associated with the task image; and
notify the owner of the modification to the execution mode.

15. A method performed by a task execution application programming interface, comprising:
receiving, from a first pipeline execution service, a first request to execute a task image in a first pipeline, wherein the first request comprises first arguments, and wherein the task image comprises executable code and an execution environment; and
obtaining first results by executing the executable code using the first arguments in the execution environment,
wherein the first pipeline execution service controls execution of the first pipeline using the first results.

16. The method of claim 15, wherein the task image determines, using the first arguments, one or more portions of the executable code to execute.

17. The method of claim 15, further comprising:
modifying the first arguments using an execution requirement of the first pipeline execution service.

18. The method of claim 15, wherein the task image further comprises an owner, the method further comprising:
determining that the first results violate an execution requirement of the first pipeline execution service; and
notifying the owner that the first results violate the execution requirement.

19. The method of claim 15, further comprising:
determining that the first results violate an execution requirement of the first pipeline execution service; and
converting the first results to a format that satisfies the execution requirement.

20. The method of claim 15, further comprising:
receiving, from a second pipeline execution service, a second request to execute the task image in a second pipeline, wherein the second request comprises second arguments; and
obtaining second results by executing the executable code using the second arguments in the execution environment,
wherein the first pipeline execution service further controls execution of the first pipeline using the second results.

* * * * *